Figure 4:
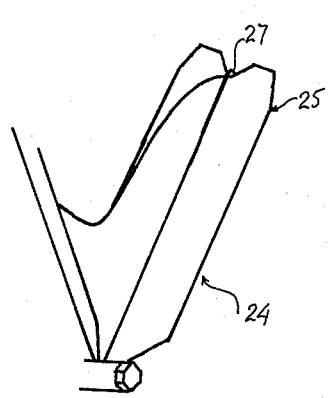
Figure 6:
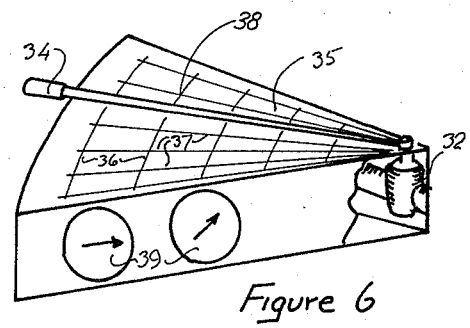
Figure 5:
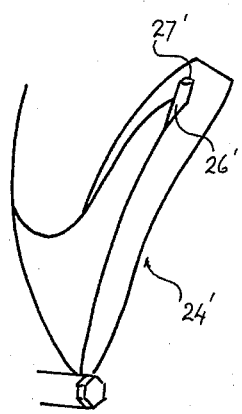
Figure 7:
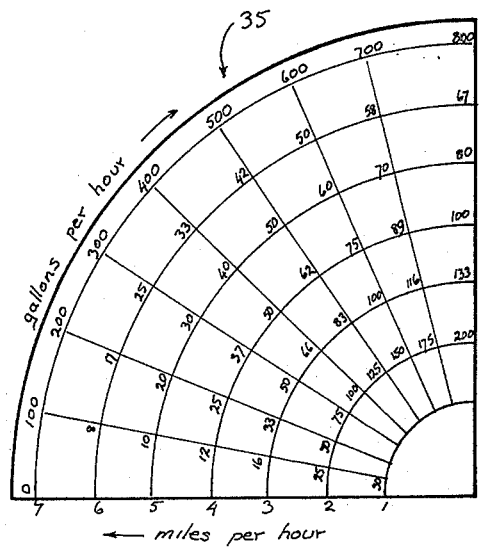

United States Patent [19]

Jenkins

[11] 3,878,989

[45] Apr. 22, 1975

[54] SPRAY APPARATUS

[76] Inventor: Thomas White Jenkins, Premaydena 7181, Tasmania, Australia

[22] Filed: Dec. 6, 1973

[21] Appl. No.: 422,367

[30] Foreign Application Priority Data

Dec. 6, 1972 Australia .............................. 1514/72

[52] U.S. Cl. ............................... 239/77; 239/214.15

[51] Int. Cl. ............................................ A01m 17/08

[58] Field of Search ...... 239/77, 78, 214.15, 214.21

[56] References Cited

UNITED STATES PATENTS

| | | | |
|---|---|---|---|
| 2,088,742 | 8/1937 | Hayward | 239/214.15 |
| 2,746,794 | 5/1956 | Fish | 239/77 |
| 2,750,708 | 6/1956 | Handfield | 239/77 X |
| 2,965,302 | 12/1960 | Waldrum | 239/77 |
| 3,130,909 | 4/1964 | Sanborn et al. | 239/78 |
| 3,335,943 | 8/1967 | Sorrenti | 239/77 X |
| 3,625,426 | 12/1971 | Swanson | 239/77 |

*Primary Examiner*—Lloyd L. King
*Assistant Examiner*—Andres Kashnikow
*Attorney, Agent, or Firm*—Donald D. Jeffery

[57] ABSTRACT

The present invention provides spray apparatus capable of producing a very fine mist-like spray capable of penetrating through foliage. The spray, normally a powder dispersed in water, is lead through open-ended passages on vertically rotating fan blades, the interaction of the centrifugal force of the blades and an induced air draft atomizing the spray. A metering tap may be used to regulate the amount of fluid supplied to the fan.

7 Claims, 7 Drawing Figures

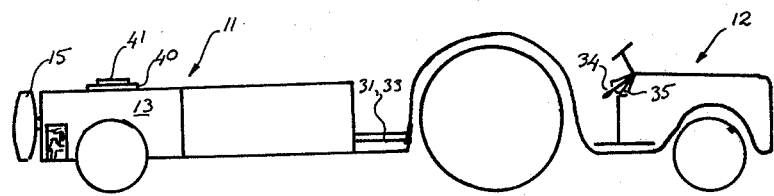
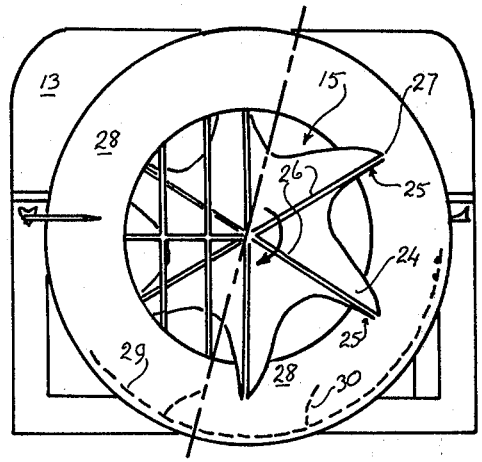
Figure 1
Figure 2
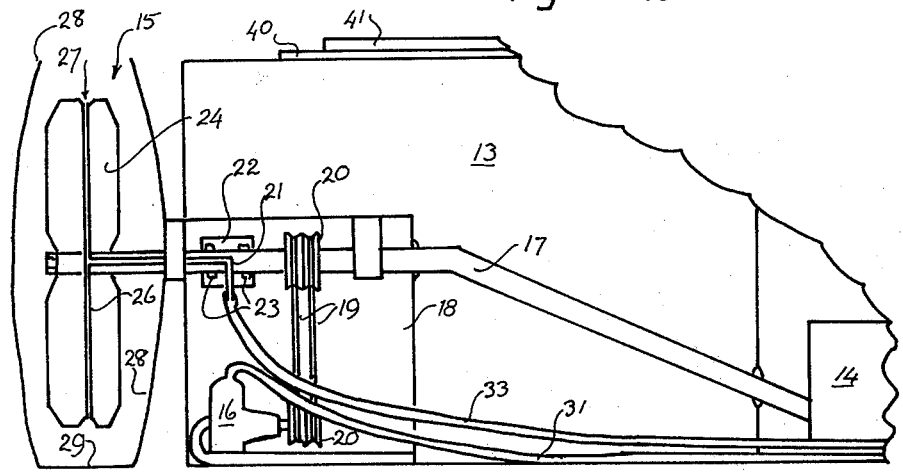
Figure 3

SPRAY APPARATUS

The present invention relates to improvements in spray apparatus and in particular to an orchard sprayer, preferably in conjunction with a metering tap to control the quantity of spray.

The object of the present invention is to provide an improved orchard sprayer whereby the spray delivered by the sprayer is very much finer than those previously known.

It is a further object to provide a spray apparatus of simple design with subsequent lowering of the costs thereof.

A further object of the present invention is to provide a metering regulator tap adapted to regulate the quantity of spray.

According to the present invention there is provided spray apparatus adapted to be drawn by a tractor, and including a fan having its blades mounted for rotation in a vertical plane, each said blade having an open-ended radial passage extending from a central passage adapted to be supplied with spray fluid to adjacent the tip of said blade so that as the blades rotate, spray fluid may be centrifuged outwardly to the open-end of the blade passage, and a pair of substantially vertical annular plates located on either side of the fan to induce an air draft between each plate and the fan blades thereby atomizing the emitted spray.

In a preferred embodiment, the invention provides spray apparatus comprising a trailer adapted to be drawn by a tractor, said trailer housing at the rearward end a fan, and at the forward end, an engine to drive the fan, a vat for spray fluid located between the engine and fan, said fan having its blades mounted for rotation in a vertical plane between a pair of substantially vertical annular plates, each said blade having an open ended radial passage extending from a central passage in communication with a supply of fluid from the vat, whereby as the blades rotate, spray fluid may be centrifuged outwardly through the blade passages, the annular plates inducing an air draft between the plates and the fan blades thereby atomizing the emitted spray. Thus, the spray, by reason of the forces caused by the blade rotation and induced air draft is finer than previously known sprays.

Preferably there is used in conjunction with the above spray apparatus a metering control system, wherein a lever connected to the metering tap passes across a quadrant chart, said chart being a plot of tractor miles per hour against gallons per hour delivered to the spray head, the intersections of the two series of lines giving the delivery rate in gallons per acre.

But in order that the invention may be more clearly understood, reference will now be made to the accompanying drawings, wherein:

FIG. 1 is a perspective view of the sprayer according to the invention, connected to a tractor;

FIG. 2 is a front elevation of the sprayer showing the fan with the front guard partly cut away;

FIG. 3 is a longitudinal sectional view showing the drive and spray circuit;

FIG. 4 shows an end of a fan blade;

FIG. 5 shows an alternative end of a fan blade;

FIG. 6 is a perspective view of the metering control, and

FIG. 7 shows a lay-out of the quadrant chart.

The spray apparatus 11 which is attached to and drawn by a tractor 12, consists of a spray vat 13 and an engine 14 to drive the fan 15 and spray pump 16. The engine 14 is mounted forward of the spray vat 13 and the drive shaft 17 passes through the vat 13, isolated from the spray therein, to a rear compartment 18 housing the spray pump 16, a belt 19 and pulley 20 take-off therefor on the drive shaft, a feed pipe 21 for the spray which is led via sleeve 22 through the center of the shaft 17 to the fan 15. Sleeve 22 has seals 23 at either end to prevent leakage of spray therefrom. It is to be noted that as the spray is not under pressure, so simple seals suffice for sleeve 22.

Instead of using a separate engine, the spray pump and fan may be driven directly by the power take-off of the tractor trailing the spray vat and fan assembly.

The fan 15 has six shaped blades 24, the leading edge 25 of each blade extending radially from the center of the fan and having mounted thereon a passage 26 for the spray, the outlet 27 of each passage 26 being slightly recessed in the blade (see FIG. 4). Alternatively the blades 24′ may be curved, with the passages 26′ projecting outwardly as shown in FIG. 5.

As the blades rotate, their centrifugal action throws the spray out the open-ended passages 26. This centrifugal action, substantially vertical annular, plus the action of an induced air draft caused by the presence of plates 28 (either side of the fan 15) to direct the air to the outer circumference thereof, atomizes the spray fluid and so gives a very much finer spray than has been previously known.

In order to prevent loss of spray due to impingement on the ground below the fan, a guard 29 is provided, extending about 120° around the fan as shown in dotted lines in FIG. 2. Vanes 30 are provided on guard 29 to help redirect the spray falling on the guard 29 and give a more even distribution.

The spray pump 16, driven by a belt 19 from a pulley 20 on the drive shaft 17, is used to pump spray fluid from the spray vat to the fan and to agitate jets (not shown) in the vat 13. As the spray fluid need not be under pressure, the pump does not have to pressurize the fluid, and they spray outlets 27 on the fan blades need only be openings.

As the spray apparatus of the present invention is preferably used in conjunction with a metering-regulator tap, the pump 16 pumps the spray fluid from the vat 13, via hose 31, to a metering-regulator tap 32 which is located on the tractor, and thence via hose 33 to sleeve 22 and to the fan 15. In this way the tractor driver may regulate the supply of spray to any given area.

The metering-regulator tap 32 consists of a rotatable cock (not shown) giving a constant variation of supply fluid from OFF to ON, the OFF-ON positions being at right angles to each other so that by extending the tap handle 34 is may be used as an indicator for a quadrant chart 35 indicating the quantity of spray delivered. The chart itself is a plate which is located in a readily visible position on the tractor and consists of a series of concentric quadrants 36, each quadrant representing a different rate of speed of tractor (say a variation of 1 to 7 miles per hour) and a series of rays 37 radiating from the center, each ray representing a different rate of fluid supply (say 0, 100, 200 . . . 800 gallons per hour). The intersections 38 of the rays and quadrants are assigned numerical values representing the quantity of fluid delivered to a particular area (in gallon per acre). Dials 39 located adjacent the quadrant chart 35 indicate to the tractor driver the tractor speed and the pump output delivery.

Thus it is possible for the driver of the tractor to adjust the quantity of spray falling on a particular area merely by turning the tap handle 34 (which is set radially with the tap spindle concentric with the chart) to any desired reading, having regard to the tractor speed and the rate of delivery of the pump. Thus adjustments in concentration may be made without having to change jets or any other parts of the spray head.

Due to the fineness of the spray discharged, the spray apparatus of the present invention produces an efficient spray which completely covers the trees to be sprayed with a fine mist thereby effectively coating both sides of each leaf. As most sprays are in the form of powders dispersed in water, the water quickly evaporates, leaving the spray-coated leaves.

Preferably to avoid corrosion, the spray apparatus, including both the interior and exterior of the vat are galvanized, a manhole 40 being left in the top of the vat, adjacent the lid 41 thereof, to allow access to the interior of the vat.

Thus it will be seen from the foregoing that the present invention provides not only a finer and so superior spray apparatus, but also a convenient method of regulating the output thereof.

I claim:

1. Spray apparatus adapted to be drawn by a tractor and including a fan having its blades mounted for rotation in a vertical plane, each said blade having an open-ended radial passage extending from a central passage adapted to be supplied with spray fluid to adjacent the tip of said blade so that as the blades rotate, spray fluid may be centrifuged outwardly to the open end of the blade passage, and a pair of substantially vertical annular plates located on either side of the fan and extending beyond the tips of the blades to induce an air draft between each plate and the fan blades whereby the spray emitted from the tips of the blades is atomized by the air draft and discharged as a fine mist or fog.

2. Spray apparatus as claimed in claim 1 further including controls mounted on the tractor to regulate the rate of spray emitted, said controls including a lever connected to a tap for metering the spray emission rate, said lever passing over a quadrant chart.

3. Spray apparatus as claimed in claim 1 further including a guard extending partly around the outside of the fan between the annular plates to prevent loss of spray fluid due to impingement on the ground, said guard being provided with vanes to redirect spray fluid and give a more even distribution.

4. Spray apparatus comprising a trailer adapted to be drawn by a tractor, said trailer housing at the rearward end a fan, and the forward end an engine to drive the fan, a vat for spray fluid located between the engine and fan, said fan having its blades mounted for rotation in a vertical plane between a pair of substantially vertical annular plates, which plates extend beyond the tips of the blades, each said blade having an open-ended radial passage extending from a central passage in communication with a supply of fluid from the vat, whereby as the blades rotate, spray fluid may be centrifuged outwardly through the blade passages and atomized by an air draft induced between the annular plates and the fan blades, the spray being discharged as a mist or fog.

5. Spray apparatus as claimed in claim 4 wherein the fan is driven from the engine by a driveshaft, the rearward end of which is hollow, and spray fluid is introduced into the hollow of the driveshaft from the vat, and from the hollow into a central passage of the fan.

6. Spray apparatus as claimed in claim 4 further including controls mounted on the tractor to regulate the rate of spray emitted, said controls including a lever connected to a tap for metering the spray emission rate, said lever passing over a quadrant chart.

7. Spray apparatus as claimed in claim 4 further including a guard extending partly around the outside of the fan between the annular plates to prevent loss of spray fluid due to impingement on the ground, said guard being provided with vanes to redirect spray fluid and give a more even distribution.

* * * * *